(12) United States Patent
Vasishta et al.

(10) Patent No.: US 7,794,836 B2
(45) Date of Patent: Sep. 14, 2010

(54) MICROENCAPSULATION OF OXYGEN OR WATER SENSITIVE MATERIALS

(75) Inventors: Niraj Vasishtha, San Antonio, TX (US); Herman W. Schlameus, San Antonio, TX (US); Darren E. Barlow, Floresville, TX (US)

(73) Assignee: Southwest Research Institute, San Antonio, TX (US)

( * ) Notice: Subject to any disclaimer, the term of this patent is extended or adjusted under 35 U.S.C. 154(b) by 109 days.

(21) Appl. No.: 10/654,422

(22) Filed: Sep. 4, 2003

(65) Prior Publication Data

US 2005/0249952 A1 Nov. 10, 2005

Related U.S. Application Data

(60) Provisional application No. 60/407,694, filed on Sep. 4, 2002.

(51) Int. Cl.
*A61K 9/50* (2006.01)
*B01J 13/00* (2006.01)
*A61J 3/07* (2006.01)

(52) U.S. Cl. .................... 428/402.21; 428/402.24; 428/403; 424/490; 264/4.1; 264/4.32; 427/213.3

(58) Field of Classification Search ............. 252/522 A; 426/3; 424/66, 490; 428/402.21, 402.24, 428/403; 264/4.1, 4.32; 427/213.3
See application file for complete search history.

(56) References Cited

U.S. PATENT DOCUMENTS

| 4,145,184 A | * | 3/1979 | Brain et al. .................... 8/137 |
| 4,282,236 A |   | 8/1981 | Broom |
| 4,288,460 A | * | 9/1981 | Ciliberto et al. .............. 426/96 |
| 4,392,988 A |   | 7/1983 | Dobson et al. |
| 4,428,869 A | * | 1/1984 | Munteanu et al. ............. 512/4 |
| 5,128,114 A |   | 7/1992 | Schwartz |
| 5,352,645 A |   | 10/1994 | Schwartz |
| 5,530,057 A |   | 6/1996 | Humphrey et al. |
| 5,585,115 A | * | 12/1996 | Sherwood et al. ........... 424/489 |
| 5,672,640 A |   | 9/1997 | Brauer |
| 6,107,238 A |   | 8/2000 | Contractor et al. |
| 6,162,857 A | * | 12/2000 | Trexler et al. ............... 524/445 |
| 6,362,128 B1 |  | 3/2002 | Schwartz |
| 2004/0053037 A1 | | 3/2004 | Koch et al. |

FOREIGN PATENT DOCUMENTS

| DE | 24 23 830 A | 12/1974 |
| EP | 0 336 662 A | 10/1989 |
| GB | 1 432 725 A | 4/1976 |
| JP | A-2-164439 | 6/1990 |
| JP | A-7-88355 | 4/1995 |

* cited by examiner

Primary Examiner—James Seidleck
Assistant Examiner—Saira Haider
(74) Attorney, Agent, or Firm—Grossman, Tucker et al.

(57) ABSTRACT

A barrier coating composition includes a polymer material and a structuring agent dispersed in said polymer material, wherein the structuring agent decreases oxygen or water permeability through the polymer material. The barrier coating composition can be used to coat a core component, which can be oxygen or water sensitive, to form a microencapsulated material. The microencapsulated material can be formed by microencapsulation methods, which include atomization or coacervation methods, including forming an oil emulsion of an oil phase and an aqueous phase, the oil phase including the core component and the aqueous phase including the polymer material, adding the structuring agent to one of the oil phase and the aqueous phase, mixing the oil emulsion to form desired particle sizes of the core component, forming the shell component around the core component to form the microencapsulated material, and extracting the formed microencapsulated material from the oil emulsion.

8 Claims, No Drawings

MICROENCAPSULATION OF OXYGEN OR WATER SENSITIVE MATERIALS

This nonprovisional application claims the benefit of U.S. Provisional Application No. 60/407,694, filed Sep. 4, 2002.

BACKGROUND OF THE INVENTION

1. Field of Invention

This invention relates to microencapsulation of materials, particularly oxygen and/or water sensitive materials, which microcapsules reduce or inhibit oxygen and/or water permeation into the interior space to thereby protect the encapsulated materials.

2. Description of Related Art

In many industries, various ingredients are used that exhibit significant decrease or degradation in their desired properties due to oxidation and/or hydrolysis. For example, the food, pharmaceutical, nutraceutical, cosmetics, consumer products, personal care, agrochemical, and chemical industries utilize a significant number of substances that are prone to oxidation. As the substances oxidize, the desired properties of the substances can be decreased or degraded, or even eliminated, or the properties of the substance can be changed entirely to provide undesired properties. In these instances, oxidation protection is required in order to ensure that the substances provide their desired effects at the time of their ultimate use.

For example, the food industry is making increased use of unsaturated fatty acids in a variety of products. For example, unsaturated fatty acids such as eicosapentaneoic acid (EPA), docosahexaenoic acid (DHA), aracadonoic acid (ARA), and conjugated linoleic acid and linolenic acid (CLA) have found increasing use in recent years. However, these unsaturated fatty acids are susceptible to oxidation, which could render the acids unsuitable for their intended use. Other food ingredients, such as vitamins, nutritional supplements, minerals, herbal products, food additives, amino acids, and the like, including, for example, betacarotene, lutein, zeazanthin, iron salts, copper salts, selenium salts, flavonoids, coenzyme Q10, herbs, spices, and flavorants and extracts (such as allicin or garlic extract), are also susceptible to oxidation.

In a similar manner, numerous protein and peptide drugs and amino acid residues, especially sulfur-linked amino acid residues, require oxidative protection to retain their desired activity. This principle also applies to such additives as surfactants, enzymes, peroxides, and fragrances, typically used in such commercial products as antiperspirants, deodorants, toothpastes, and detergents.

In the chemical industry, numerous reactants and intermediaries are also subject to hydrolytic damage. For example, numerous catalysts such as Ziegler-Natta, Fischer-Tropsch catalysts, and the like are sensitive to hydrolysis and oxygen.

Despite the recognized problems of oxidative and hydrolytic damage to numerous chemical compounds and entities, the need continues to exist for effective means to counter the oxidation or hydrolytic process. The need thus exists in the art to provide effective protection for a wide range of materials, to avoid oxidation damage and hydrolytic degradation to preserve the desired positive properties of the materials.

SUMMARY OF THE INVENTION

The present invention addresses the need in the art by providing effective means to protect materials from oxidative and hydrolytic damage. In particular, the present invention provides microencapsulation materials and methods, which protect the encapsulated materials from oxygen and/or water diffusion through the encapsulating material, and thus protect the encapsulated materials from oxidation or hydrolysis.

The present invention thus relates to making microcapsules and microspheres, generally using polymers containing structuring agents, for the microencapsulation of materials, particularly oxygen and/or water sensitive materials for protection against oxygen and water. Shells providing decreased oxygen and/or water permeability, or even oxygen and/or water impermeability, are provided by using suitable polymers in synergy with surface-charged structuring agents such as clays, mica, silicates, or combinations thereof. Polymers can be suitable selected from a class of proteins, polysaccharides, starches, waxes, gums, and thermoplastic resins, which themselves offer low oxygen and/or water transmission, exhibit strong ionic charge, and/or exhibit strong hydrogen-bonding interaction. Further enhancement of the oxygen and/or water barrier properties can be achieved when antioxidants, amino acid residues, phospholipids, waxes, and/or sugars are added to the formulation.

The present invention thus relates to the microencapsulation of materials, i.e., microcapsules with a shell well containing structuring agents to provide a higher shelf-life for oxygen and/or water sensitive ingredients. The present invention also relates to methods for forming such microcapsules. The present invention is applicable to a wide variety of materials useful in a variety of fields, including food, pharmaceutical, nutraceutical, cosmetics, consumer products, personal care, agrochemical, and chemical industries, which utilize a significant number of substances that are prone to oxidation and hydrolysis. In embodiments, the microencapsulation of the present invention can also be extended to membrane technology applications, where the oxygen and/or water sensitive material is embedded as a dispersed phase in a continuous or membrane phase of the encapsulant material.

More particularly, in embodiments, the present invention provides a barrier coating composition, comprising: a polymer material, and a structuring agent dispersed in said polymer material, wherein said structuring agent decreases oxygen or water permeability through said polymer material.

In another embodiment, the present invention provides a microencapsulated material, comprising: a core component, and a shell component encapsulating said core component, wherein said shell component comprises a polymer material and a structuring agent, wherein said structuring agent decreases oxygen or water permeability through said polymer material.

In still further embodiments, the present invention provides methods, such as atomization, coacervation, or co-extrusion methods, for forming the microencapsulated material, comprising:

forming an oil emulsion comprising an oil phase and an aqueous phase, said oil phase comprising said core component, said aqueous phase comprising said polymer material;

adding said structuring material to at least one of said oil phase and said aqueous phase;

mixing said oil emulsion to form desired particle sizes of said core component;

forming said shell component around said core component to form said microencapsulated material; and extracting said formed microencapsulated material from said oil emulsion.

DETAILED DESCRIPTION OF EXEMPLARY EMBODIMENTS

According to the present invention, a microencapsulation material is provided that comprises a polymer material and a structuring agent. The microencapsulation material is used to encapsulate any desired materials, particularly oxygen and/or water sensitive materials. According to the present invention, the microcapsules can be formed by a variety of methods of microencapsulation, including an atomization method, a complex coacervation method, and a co-extrusion method.

As is generally known in the art, polymers themselves exhibit limited oxygen impermeability by a variety of means. For example, polymers generally (1) present a low partitioning coefficient with oxygen, (2) include pendant groups or moieties that scavenge oxygen permeating through the polymer, (3) exhibit an increase in glass transition temperature that corresponds to a decrease in the diffusion coefficient of the polymer, and (4) offer strong hydrogen-bonding attractions. One of the best, and most widely practiced, methods to reduce oxygen permeation through a polymer is to select a polymer that has a low partition coefficient with respect to oxygen solubility.

However, use of polymers alone to provide desired oxygen and/or water barrier properties is often not sufficient for many uses. For example, many polymers still exhibit undesirably high oxygen and/or water transmission rates, and thus are unsuitable for oxygen and/or water sensitive materials. Alternatively, depending upon the use of the resultant material, various polymers cannot be selected. For example, in the food, pharmaceutical and nutraceutical areas, as well as in the area of consumer goods, a polymer must be selected that is appropriate for ingestion or for contact with tissues. In these and other areas, proper selection of the encapsulating polymer must thus account for not only the material to be encapsulated and the oxygen and/or water permeability through the polymer, but also the polymer's suitability for future use.

According to the present invention, the encapsulating material generally comprises a polymer material and a structuring agent. Suitable polymer materials can be selected from any of the widely known and used polymer materials and waxes. Because a structuring agent is included in the encapsulating material, the selected polymer itself can in embodiments provide any degree of oxygen and/or water permeability, ranging from substantially oxygen and/or water permeable to substantially oxygen and/or water impermeable.

The polymer used as an encapsulating material in the present invention can be selected from any suitable known or after-developed polymers. In embodiments, the polymer can be selected from, but is not limited to, gelatin; alginate; carrageenan; casein; proteins, such as whey protein, soy protein, or corn protein; polysaccharides, such as chitosan or pullulan; waxes; gums; synthetic polymer materials, such as polyethylene terephthalate, nylons, polyurethanes, polyglycolic acid, polyethylene glycol, polyamides, acetates, triacetates, polyacrylics, polyacrylonitile, polyaramids, polyolefins including polyethylenes and polypropylenes, fluorinated polymers such as polytetrafluoroethylene, polyesters, polyvinyl alcohol; polyvinylidene fluoride such as SARAN™ made by Asahi Kasei Co., Ltd., polyvinyl acetate, and the like; cellulose and cellulose derivatives, such as cellulose, ethyl cellulose, cellulose acetate trimellitate, cellulose acetate phthalate, methyl cellulose, and the like; fats; waxes; rosins; mixtures thereof; and the like. Of these, various of the materials such as gelatin, casein, proteins and polysaccharides are preferred for applications in the food, pharmaceutical and consumer goods areas, while other materials, such as the synthetic polymer materials are preferred for other applications.

In embodiments, the polymer material preferably, but need not, comprises pendant ionic groups. Such pendant ionic groups are believed to provide increased oxygen or water barrier properties, because the ionic groups interact with ionic groups in the structuring agent to provide tighter interstitial spacing and thus decreased permeability. Such pendant ionic groups can include, for example, but are not limited to, polycations, such as gelatin, polyvinyl pyrolidone (PVP), albumin, and polyethyleneimine (PEI), and the like; polyanions, such as acacia gum, cellulose derivatives, calcium polypectate, maleic anhydride derivatives, polyacrylic and methacrylic acid, phospholipids, polyglycolide and lactide derivatives, starch, alginates and alginic acid, calcium caseinate, carrageenan, pectins, polyhexametaphosphate, polyvinyl acetate, polyvinyl alcohol, and the like; mixtures thereof; and the like.

Although the above-described polymer materials exhibit some degree of oxygen and/or water barrier properties, most of the polymer materials by themselves do not provide the desired high degree of oxygen and/or water impermeability to provide the desired protection of oxygen and/or water sensitive materials. Accordingly, according to the present invention, the encapsulating material includes both a polymer as described above, and a suitable structuring agent. Addition of the structuring agent has been found to decrease the oxygen and/or water permeability of the polymer, and thus increasing the shelf-life and usefulness of the encapsulated material, such as any of the various oxygen and/or water sensitive compounds.

According to the present invention, the structuring agent can be incorporated into the polymer matrix, such as being uniformly or non-uniformly dispersed in the polymer matrix, or it can be incorporated as a distinct layer as part of the microcapsule. When incorporated into the polymer matrix, the structuring agent can be simply mixed into the polymer mass, thus providing the described uniform or non-uniform dispersion, or it can be bond into the polymer network such as by cross-linking, ionic bonding, covalent bonding, strong hydrogen bonding, or the like. When incorporated into the microcapsules as a distinct layer, the structuring agent can be provided as a distinct layer either on the inner our outer surface of the microcapsules, with the exterior surface being preferred. In this embodiment, the structuring agent provides platelet-like structures on the surface of the polymer material. By a distinct layer herein is meant that the structuring agent can be a distinctly separate layer, or a layer that is at least partially intertwined with the polymer material such that a gradient exists extending radially into the microcapsule, generally from structuring agent to mixture of structuring agent and polymer material to polymer material. In both of these embodiments, the structuring agent preferably provides a highly tortuous structure, which reduces oxygen and/or water permeation through the material.

The structuring agent used as part of the encapsulating material in the present invention can be selected from any suitable known or after-developed material that provides added structure to the microcapsule while decreasing oxygen and/or water permeation through the microcapsule material. In embodiments, the structuring agent can be selected from, but is not limited to, clay, such as bentonite including sodium bentonite and calcium bentonite, montmorilonite, attapulgite, terramine, kaolin, hormite, saponite, laponite, French-green, Fuller's earth, and the like; silicates, such as layered magnesium aluminum silicate platelets, micas, talc, diatomaceous silicates, precipitated silicas, fumed silicas, hydrophilic silicates and hydrophobic silicates; starches, such as hydrophobic starch molecules; phospholipids; pillared or pillared-like materials; metal salts such as nano-sized platelets of metal salts; mixtures thereof; and the like.

When clays are used as the structuring agent, the clay can be in any desired form, such as clay platelets, particles, colloids, or the like. Preferably, however, a clay used in the present invention is platelike-like in nature, as such clays provide high surface area and chemical surface reactivity. When used for food or pharmaceutical materials, the clay material is preferably bentonite or terramine, as these materials are generally recognized as safe and/or approved for such uses. When used for other purposes, such as cosmetics, chemicals, or the like, other clay materials can be used.

Generally, the structuring agent is present in an amount of from about 1 to about 50% by weight of the encapsulating material. However, particular amounts of the structuring agent can be selected based, for example, on the material to be encapsulated, the other encapsulating materials, desired properties, and the like.

If desired, other additives can be included in the encapsulating composition, such as antioxidants, amino acid residues, phospholipids, sugars, cross-linking agents, colorants, and the like. Such materials can be included in known amounts for their known purposes. For example, further enhancement of the oxygen and/or water barrier properties can be achieved when antioxidants, amino acid residues, phospholipids, and/or sugars are added to the formulation.

Any desired material, and particularly any oxygen and/or water sensitive material, can be encapsulated in the encapsulating material according to the present invention. Because the encapsulating material of the present invention provides significantly improved oxygen and/or water barrier properties, it is particularly applicable to oxygen and/or water sensitive compounds, which are easily oxidized or degraded by contact with oxygen and water. Without limiting the present invention, exemplary materials that exhibit oxygen and/or water sensitivity, and thus that are useful in the present invention, include unsaturated fatty acids, such as eicosapentaneoic acid (EPA), docosahexaenoic acid (DHA), aracadonoic acid (ARA), and conjugated linoleic acid and linolenic acid (CLA); other food ingredients, such as vitamins, nutritional supplements, minerals, herbal products, food additives, and the like, including, for example, betacarotene, lutein, zeazanthin, iron salts, copper salts, selenium salts, flavonoids, coenzyme Q10, herbs, spices, and flavorants and extracts (such as allicin or garlic extract); protein and peptide drugs; amino acids and amino acid residues, such as sulfur-linked amino acid residues; surfactants; enzymes; peroxides; fragrances; catalysts such as Ziegler-Natta catalysts and Fischer-Tropsch catalysts; and the like.

Although not limited to any particular theory, it is believed that oxygen and/or water permeation and gaseous diffusion through membrane walls, including through the encapsulating material according to the present invention, is governed by Knudsen diffusion. When the pore size resulting from the interstitial spacing between individual platelets is significantly small, the mean free path for oxygen and/or water and gaseous diffusion asymptotically approaches infinity. As a result, such shell compositions become impermeable and protect the encapsulated ingredient from oxygen and/or water permeability, lipid peroxidation, or oxidation.

Encapsulation of the oxygen and/or water sensitive or other material by the encapsulating formulation can be conducted according to any desired method, whether know or after-developed, that is effective in depositing the encapsulating composition around the material to provide an oxygen and/or water barrier. The oxygen and/or water barrier is preferably completely oxygen and/or water impermeable, or at least substantially oxygen and/or water impermeable to prevent significant oxygen and/or water permeation over a desired time period or shelf-life. However, depending on the encapsulated material and its desired uses, some degree of oxygen and/or water permeability may be acceptable. Two exemplary but non-limiting methods for forming the encapsulated material include atomization methods and coacervation methods.

One such exemplary method for forming the encapsulated materials of the invention is an atomization method. Atomization methods are generally known for forming microencapsulated materials. In the atomization method, an oil phase and a liquid phase are typically formed and then mixed under high shear to form the desired particle size microcapsules. These microcapsules can be formed around a desired core material, to provide the microcapsules. Such methods can readily be applied to the present invention, where the structuring agents are added to the conventional atomization process to provide a microcapsule shell having the above-described combination of components. The atomization method will now be described in more detail.

A first step of the atomization process is to form separate oil and aqueous phases of the microcapsule components. In the oil phase is typically contained the material to be encapsulated. The oil phase can thus contain the oxygen and/or water sensitive material, preferably in an amount of from about 10 to about 100 percent by weight, by total weight of the oil phase. However, weight loadings outside this range can be used, if desired. If desired, additional conventional additives can be included in the oil phase, in known amounts for their known purposes. For example, the oil phase can further comprise, if desired or necessary, such additives as wetting agents and antioxidants. If used, such additional materials should preferably be present in an amount of from about 0.5 to about 5 percent by weight of the total oil phase. However, weight loadings outside this range can be used, if desired.

The aqueous phase typically contains the encapsulant or shell-forming material. The aqueous phase can thus contain the encapsulant or shell-forming material, such as the above-described polymer, protein, and the like. Preferably, although not required, the aqueous phase also includes a stabilizing emulsifier. The encapsulant or shell-forming material is preferably contained in an amount of from about 1 to about 25 percent by weight, and the optional stabilizing emulsifier, if present, is preferably contained in an amount of from less than about 1 to about 2 percent by weight, by total weight of the aqueous phase. However, weight loadings outside these ranges can be used, if desired. If desired, additional conventional additives can be included in the aqueous phase, in known amounts for their known purposes. For example, the aqueous phase can further comprise, if desired or necessary, such additives as wetting agents and antioxidants. If used, such additional materials should preferably be present in an amount of from about 0.5 to about 5 percent by weight of the total aqueous phase. However, weight loadings outside this range can be used, if desired.

Once the oil and aqueous phases are prepared, an oil emulsion in an aqueous polymer solution is prepared by mixing the oil and aqueous phases. The emulsification step is preferably conducted under an inert atmosphere, to prevent premature oxidation of the oxygen and/or water sensitive material. The emulsification step is preferably conducted at a temperature of from about 10 to about 50° C., preferably from about 10 to about 25° C., although temperatures outside these ranges can be used, in embodiments.

The microsphere size of the particles to be formed generally depends upon the shear or mixing rate of the emulsion. That is, the higher the shear or mixing rate, the smaller the resultant microcapsules will be. In embodiments of the present invention, the mixing rate is selected to be from about 500 to about 10,000 rpm, which provides microspheres having a diameter of from about 1 to about 500 μm, preferably from about 25 to about 100 μm.

The above description of the process thus far generally represents a conventional atomization process. However, according to the present invention, a structuring agent is further added to the composition to provide improved oxygen and/or water barrier properties. Once the emulsion is formed, and during the stirring thereof, the desired microsphere structuring agent is added and mixing continues. Although not particularly limited, it is preferred in embodiments that the structuring agent has an average particle size of from about 0.1 to about 1 μm. Continued mixing of the emulsion and the structuring agent causes the structuring agent to be incorporated into the microcapsule or shell formulation. If desired, for example where the structuring agent is anionic in nature, amino acid residues such as choline or pyridine can be added to provide charge neutrality. The amount of such added amino acid residues will depend, for example, on the desired degree of charge neutrality and the type of structuring agent.

Once the structuring agent is added, the atomization process continues according to conventional processes. The resultant emulsified suspension can then be spray-dried or disk atomized according to conventional processing. For example, for spray drying, the emulsified suspension can be spray-dried at an inlet temperature of from about 100 to about 300° C., preferably from about 110 to about 180° C., and an outlet temperature of from about 50 to about 100° C., preferably from about 60 to about 75° C. The resultant microspheres generally have a diameter of from about 5 to about 100 μm.

As a modification of the above process, a spray chilling process can be used to form the microcapsules. In this process, the structuring agent is added into the molten resin, to prevent the active (core) material from separating after mixing and/or during subsequent storage. The incorporation of the structuring agent permits preparation of a wax capsule by a simple modification (addition of the structuring agent) to a conventional droplet formation or solidification methods known in the art. Capsules prepared according to this method are generally from about 5 to about 3,000 μm in diameter, preferably from about 5 to about 1,000 μm in diameter, and most preferably from about 25 to about 100 μm in diameter. The structuring agent in such microcapsules should preferably be present in an amount of from about 1.0 to about 50% by weight of the capsule shell composition, preferably from about 10 to about 20% by weight of the capsule shell composition.

A preferred method for forming the microcapsules is a coacervation, or complex coacervation, method. Coacervation methods are generally known for forming microencapsulated materials. In the coacervation method, an oil-water suspension is also formed, but the microcapsule is formed by causing the encapsulant material to precipitate at the surface of the oil-water interface, i.e., around the core material, by means of the anionic and cationic properties of the colloidal materials. Such methods can readily be applied to the present invention, where the structuring agents are added to the conventional coacervation process to provide a microcapsule shell having the above-described combination of components. The coacervation method will now be described in more detail.

A first step of the coacervation process is to form separate oil and aqueous phases of the microcapsule components. In the oil phase is typically contained the material to be encapsulated. The oil phase can thus contain the oxygen and/or water sensitive material, preferably in an amount of from about 75 to about 95 percent by weight by total weight of the oil phase. However, weight loadings outside this range can be used, if desired. The desired structuring agent can also be added to the oil phase, preferably in an amount of from about 0.1 to about 50 percent by weight of the oil phase. Although the structuring agent need not be added to the oil phase, such addition is preferred in embodiments where the oil phase is a surface active oil phase. For non-ionic oil phases, the structuring agent need not be added to the oil phase, but can be added separately to the resultant emulsion.

The aqueous phase typically contains the encapsulant or shell-forming material. The aqueous phase can thus contain the encapsulant or shell-forming material, such as the above-described polymer, protein, and the like. The encapsulant or shell-forming material is preferably contained in an amount of from about 5 to about 20 percent by weight, preferably from about 5 to about 15 percent by weight, and most preferably from about 8 to about 11 percent by weight, by total weight of the aqueous phase. However, weight loadings outside these ranges can be used, if desired.

Once the oil and aqueous phases are prepared, an oil emulsion in an aqueous polymer solution is prepared by mixing the oil and aqueous phases.

The microsphere size of the particles to be formed generally depends upon the shear or mixing rate of the emulsion. That is, the higher the shear or mixing rate, the smaller the resultant microcapsules will be. In embodiments of the present invention, the mixing rate is selected to be from about 100 to about 10,000 rpm, preferably from about 500 to about 2,000 rpm, which provides microspheres having a diameter of from about 1 to about 500 μm, preferably from about 25 to about 100 μm.

The above description of the process thus far generally represents a conventional coacervation process, except for the optional addition of the structuring agent to the oil phase. However, according to the present invention, a structuring agent is further added to the composition to provide improved oxygen and/or water barrier properties. Once the emulsion is formed, and during the stirring thereof (preferably at lower rpm), the desired microsphere structuring agent is added and mixing continues. Although not particularly limited, it is preferred in embodiments that the structuring agent has an average particle size of from about 0.1 to about 2 μm, preferably from about 0.1 to about 0.5 μm. Because the structuring agent is added to the process, either after emulsion formation and/or by addition to the oil phase, it is not necessary to add anionic materials such as alginate, CMC, acacia, polyphosphate or the like, which is conventionally used in coacervation processes. If the structuring agent is added to the surface of the formed capsules, this step is still necessary to form the capsules.

After the structuring agent is added, the resultant solution is diluted to a polymer concentration of preferably less than about 3 weight percent. This brings the solution to within the coacervate phase domain.

If necessary, the pH of the diluted solution can be adjusted. Such pH adjustment can be conducted by conventional means, such as by adding necessary amounts of pH adjustment agents such as amino acid residues (such as choline), citric acid, lactic acid, ascorbic acid, or acetic acid. The pH is adjusted, if necessary, to convert the amphoteric polymers from anionic potential to cationic potential. Typically, the pH is in a range of from about 4.4 to about 4.9, although a pH outside this range may be used, as appropriate.

The resultant solution is next cooled to below its gel point to form microcapsules. Crosslinking, using conventional crosslinking agents, can be conducted. Suitable crosslinking agents include, but are not limited to, transglutaminase, glutaraldehyde, cimmaldehyde, tannic acid, alum, and the like, and can be used in conventional amounts.

The resultant formed microspheres are isolated by filtration or by spray-drying methods as described above. The resultant microspheres generally have a diameter of from about 0.5 to about 500 μm, preferably from about 10 to about 100 μm, and more preferably from about 25 to about 70 μm.

To remove excess surface oil, if necessary, the formed microcapsules can be washed with a surfactant, solvent, or mixture thereof. Various apparatus and methods for removing excess surface oil are known in the art and can be readily employed in the present invention.

As described above, the structuring agent according to the present invention can be present at different locations in the microcapsule. For example, if the structuring agent is added to the capsule suspension after microcapsule shells have already formed, then the structuring agent will deposit on the outer surface of the formed shell, resulting in a distinct outer layer. Alternatively, if the structuring agent is included in the process during microcapsule formation, the structuring agent can be included with the wall material in the wall of the microcapsule, i.e., forming the structuring agent would be dispersed with the wall material. Still further, the structuring agent can be first deposited as on the surface of the core material, following by formation of the microcapsule wall on the outer surface of the structuring agent, resulting in a two-wall structure where the structuring agent forms an inner wall.

Microcapsules can also be prepared using a co-extrusion nozzle process. In this process, the nozzles generally consist of concentric orifices through which the shell and fill materials are pumped, with the shell passing through the outer orifice and the fill through the inner orifice. The extruded stream consists of a core of fill material surrounded by a sheath of shell material. As the stream breaks into droplets, the shell wraps around the fill and liquid capsules are formed. They are then hardened by any suitable technique, depending on the particular shell system that is being used. The structuring agents can be added either to the core material or the shell material, for example, in a range of from about 1 to about 50% by weight.

An advantage of the present invention is that the invention provides products and methods heretofore not known in the art. The invention provides methods for protecting oxygen and/or water sensitive materials, as well as other materials, from the destructive contact with oxygen and/or water or other permeating species.

For example, in the case of oils and fats, it has been conventionally known to try to encapsulate the oils and fats to protect them from oxidation and hydrolysis. Such oils and fats have conventionally been protected by either using physical means to keep the oils and fats away from oxygen or water and storing them at reduced temperature, or by using chemical means such as adding antioxidants to the composition. Although antioxidants can be used, they are only useful to a limited extent. That is, although the antioxidant effect increases as more antioxidant is added and phospholipids are added to provide a water barrier, the benefits eventually plateaus. In the use of antioxidants, as more antioxidant is added, additional benefit is not provided, and instead the added amount may itself cause oxidation to occur.

In contrast to the conventional methods, the present invention provides a means to protect chemical species from oxygen and/or water and other detrimental species. By using a structuring agent in the encapsulating material, it has been found that the encapsulating material forms an ionic bridge between platelets of the structuring agent. The result is a significant decrease in permeability of larger molecules such as oxygen and water through the capsule shell. The structure also provides charge neutralization of the ionic structuring agents, such as clay, to create an even tighter interstitial spacing between the individual platelet structures, which further reduces the oxygen and water permeation.

Although the above discussion is specifically directed to embodiments where the barrier composition is used to form microcapsules, encapsulating a material such as an oxygen or water sensitive composition, it will be apparent that the present invention is not limited to such embodiments. In particular, the principles of the present invention apply equally to a barrier film formed from the above-described composition, as well as to embodiments where the encapsulated material is in the form of the material dispersed as a dispersed phase in a continuous phase of the coating composition. In the form embodiment, the coating composition can be used to form a film product, which can be applied to a wide variety of uses as a barrier film. In the latter embodiment, rather than being in the form of distinct microcapsules, the product may be in the form of larger compositions or membranes where the embedded particles are surrounded by a continuous phase of the coating composition. All of these, and other, embodiments are encompassed by the present invention.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLES

Example 1

Demonstration of Oxygen Barrier Properties

To demonstrate the oxygen barrier properties provided by the present invention, four films are cast. The control film is made using Gelatin 300 Bloom, Type A. Three inventive films are formed using the same Gelatin 300A, mixed with varying concentrations of structuring agents glycerin or kaolin clay, according to the present invention. The specific compositions and weight ratios of the films are shown in the following Table. The oxygen transmission rates of the four films, measured at a relative humidity of 0%, are determined and are also reported in the Table.

| Polymer film | Structuring agent | Weight Ratio of (polymer to structuring agent) | OTR (cc/100 in$^2$/d/mil) |
|---|---|---|---|
| Gelatin 300A | — | — | 18.09-24.54 |
| Gelatin 300A | Glycerin | 4:1 | 11.5 |

-continued

| Polymer film | Structuring agent | Weight Ratio of (polymer to structuring agent) | OTR (cc/100 in²/d/mil) |
|---|---|---|---|
| Gelatin 300A | Kaolin | 9:1 | 3.55 |
| Gelatin 300A | Kaolin | 1:1 | 2.84 |

The results in the Table demonstrate that the film formed according to the present invention provides significant and unexpected decrease in the oxygen transmission rate.

Example 2

Relative Humidity Effect on Oxygen Barrier Properties

As in Example 1, control films are made using Gelatin 300A, i.e., without any structuring agent, and in varying thicknesses. The specific film thicknesses are shown in the following Table. The oxygen transmission rates of the films are determined at varying relative humidity, and the results are also reported in the Table.

| Polymer film | Thickness (in.) | Relative Humidity (%) | OTR (cc/100 in²/d) |
|---|---|---|---|
| Gelatin 300A | .003 | 0 | 6.03 |
| Gelatin 300A | .0053 | 0 | 4.63 |
| Gelatin 300A | .0012 | 68 | 3.44 |
| Gelatin 300A | unknown | 70 | 3.15 |
| Gelatin 300A | .0045 | 74 | 2.31 |
| Gelatin 300A | .0015 | 77 | 1.95 |

For comparison purposes, four inventive films are formed using the same Gelatin 300A, mixed with varying concentrations of the structuring agent kaolin clay, according to the present invention. The specific compositions and weight ratios of the films are shown in the following Table. The oxygen transmission rates of the four films, measured at a relative humidity of 0%, are determined and are also reported in the Table.

| Polymer film | Polymer:Clay Ratio | Thickness (in.) | Relative Humidity (%) | OTR (cc/ 100 in²/d) |
|---|---|---|---|---|
| Gelatin 300A:kaolin | 1:1 | .0015 | 0 | 1.89 |
| Gelatin 300A:kaolin | 1:1 | .0015 | 77 | 1.65 |
| Gelatin 300A:kaolin | 9:1 | .00185 | 0 | 1.92 |
| Gelatin 300A:kaolin | 9:1 | .00185 | 77 | 1.68 |

The results in the Tables above demonstrate that the films formed according to the present invention provide significant and unexpected decrease in the oxygen transmission rate. The data further indicates that the improvement is provided over a range of relative humidity.

Example 3

Preparation of Inventive Microparticles

A microparticle is prepared according to the present invention. To a 400 ml beaker is added, by pouring, 190 g deionized water and 10 g of kaolin clay. The clay is thoroughly dispersed in the deionized water by mixing by sonication for about 15 minutes. Next, gelatin (Gelatin 300 Bloom, Type A) is dispersed in the clay suspension, and the temperature is brought to 60° C. The gelatin/clay mixture is stirred thoroughly for about 5 to 10 min.

50 ml Fish oil is emulsified to the desired droplet range of about 50 to 300 μm. 20 ml polyphosphate (Calgon) 5% weight solution in deionized water is added under stirring. The pH of the emulsion/suspension is adjusted to approximately 4.4 using acetic acid (10% weight in deionized water). When capsules have formed, the capsule slurry is added to 1 L deionized water at the identical pH as the capsule slurry. This water is cold (about 0-5° C.). The formed capsules are then isolated.

Comparative Example 3

Preparation of Inventive Microparticles

For comparison purposes, a similar microparticle to Example 3 is prepared, but without using the nanoclay structuring agent.

To a 400 ml beaker is added, by pouring, 190 g deionized water and 10 g gelatin (Gelatin 300 Bloom, Type A), and the temperature is brought to 60° C. The gelatin mixture is stirred thoroughly for about 5 to 10 min.

100 ml Fish oil is added to the gelatin solution and emulsified to the desired droplet range of about 50 to 300 μm. 20 ml polyphosphate (Calgon) 5% weight solution in deionized water is added under stirring. The pH of the emulsion/suspension is adjusted to approximately 3.9 using acetic acid (10% weight in deionized water). When capsules have formed, the capsule slurry is added to 1 L deionized water at the identical pH as the capsule slurry. This water is cold (about 0-5° C.). The formed capsules are then isolated.

The microcapsules of Example 3 and Comparative Example 3 are subjected to induction period testing. The induction period is measured using an Oxipres instrument using a very sensitive oxygen bomb in a glass insert holding the microcapsule powder. The testing is conducted at a pressure of about 5 bar and a temperature of about 65° C. The oxygen content is measured. Once oxidation starts, the oxygen content decreases, and the trend proceeds very rapidly. The time needed for oxidation to begin can be extrapolated to determine shelf-life of the powder. Typically, a target induction period of between 40 to 55 hours is desired, and thus any results with a longer induction period represent a high beneficial increase in shelf-life.

Based on the testing, the induction period of the microcapsules of Example 3 is found to be 76 hours, in contrast to only 40 hours for the microcapsules of Comparative Example 3. This demonstrates that the invention provides significant unexpected increase in oxidation resistance, and thus resultant shelf-life.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

What is claimed is:

1. A microencapsulated material, comprising:
a core component, wherein said core component is at least one of oxygen sensitive or water sensitive;
a shell component encapsulating said core component, wherein said shell component comprises a polymer material and a structuring agent having an average particle size from about 0.1 to about 1 µm at a level of about 1 to 50% by weight of the shell component, said structuring agent present in the form of platelets, wherein said polymer material comprises pendant ionic groups comprising polyanions or polycations and said polymer is selected from the group consisting of gelatin, alginate, carrageenan, casein, proteins, polysaccharides, gums, synthetic polymer materials, celluloses, waxes, rosins, polyphosphates, and mixtures thereof wherein said polymer forms an ionic bridge with said dispersed structuring agent, wherein said structuring agent decreases oxygen and water permeability and protects the encapsulated ingredient from oxygen and water permeability through said polymer material rendering said shell component substantially oxygen and water impermeable and wherein said structuring agent is selected from the group consisting of clay, silicates and silicas, phospholipids, pillared-like materials, metal salts, nanoplatelets, and mixtures thereof; and wherein said polymer material forms an interior shell around said core component, and said structuring agent forms an exterior shell around said interior shell such that a gradient exists extending radially into said microcapsule from a distinct outer layer containing only said structuring agent to a mixture of said structuring agent and a polymer material to only said polymer material.

2. The microencapsulated material of claim 1, wherein said core component is selected from the group consisting of unsaturated fatty acids, betacarotene, lutein, zeazanthin, iron salts, copper salts, selenium salts, flavonoids, coenzyme Q10, herbs, spices, flavorants, extracts, protein and peptide drugs, amino acids and amino acid residues, surfactants, enzymes, peroxides, fragrances, catalysts, vitamins, nutritional supplements, minerals, herbal products, food additives, and mixtures thereof.

3. The microencapsulated material of claim 1, said shell component further comprising at least one additive selected from the group consisting of antioxidants, amino acid residues, phospholipids, sugars, and cross-linking agents.

4. The microencapsulated material of claim 1, further comprising at least one additive selected from the group consisting of antioxidants, amino acid residues, phospholipids, and sugars, wherein said at least one additive further decreases oxygen or water permeability through said polymer material.

5. The microencapsulated material of claim 1, wherein said microencapsulated material is in a form of a powder.

6. The microencapsulated material of claim 1, wherein said microencapsulated material is in a form of a membrane wherein said core component is dispersed and encapsulated within a continuous matrix of said shell component.

7. A microencapsulated material, comprising:
 a core component, wherein said core component is at least one of oxygen sensitive or water sensitive;
 a shell component encapsulating said core component, said shell component comprising an interior shell, an exterior shell, and choline or pyridine to provide charge neutrality;
 a gradient extending radially into said shell component from a distinct outer layer containing only structuring agent to a mixture of said structuring agent and a polymer material to only said polymer material;
 wherein said polymer material forms said interior shell around said core component, and said structuring agent forms said exterior shell around said interior shell;
 wherein said structuring agent decreases oxygen and water permeability and protects the core component from oxygen and water permeability through said polymer material rendering said shell component substantially oxygen and water impermeable, said structuring agent in the form of platelets having an average particle size from about 0.1 to about 1 µm at a level of about 1 to 50% by weight of said shell component and selected from the group consisting of clay, silicates and silicas, phospholipids, pillared-like materials, metal salts, nanoplatelets, and mixtures thereof; and
 wherein said polymer material comprises pendant ionic groups comprising polyanions or polycations and said polymer is selected from the group consisting of gelatin, alginate, carrageenan, casein, proteins, polysaccharides, gums, synthetic polymer materials, celluloses, waxes, rosins, polyphosphates, and mixtures thereof wherein said polymer forms an ionic bridge with said structuring agent.

8. The microencapsulated material of claim 1, wherein said microencapsulated material is formed by a method selected from atomization methods, coacervation methods, and extrusion methods.

* * * * *